No. 885,820. PATENTED APR. 28, 1908
P. WINAND & H. NEUMANN.
METHOD OF OPERATING COMBUSTION ENGINES.
APPLICATION FILED NOV. 5, 1906.
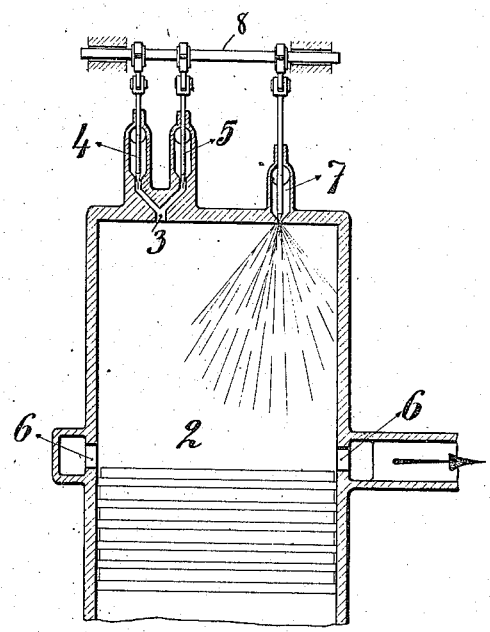

UNITED STATES PATENT OFFICE.

PAUL WINAND, OF COLOGNE, AND HANS NEUMANN, OF BERGISCH-GLADBACH, GERMANY.

METHOD OF OPERATING COMBUSTION-ENGINES.

No. 885,820.  Specification of Letters Patent.  Patented April 28, 1908.

Application filed November 5, 1906. Serial No. 342,127.

*To all whom it may concern:*

Be it known that we, PAUL WINAND, engineer, a subject of the King of Belgium, residing at Cologne, 1 Sudermannstrasse, Germany, and HANS NEUMANN, a subject of the German Emperor, residing at Bergisch-Gladbach, Wilhelmstrasse 178, Germany, have invented certain new and useful Improvements in Methods of Operating Combustion-Engines; and we do hereby declare the following to be a full, clear, and exact description of the invention, such as will enable others skilled in the art to which it appertains to make and use the same.

For the propulsion of submarine boats it is customary to use a combustion engine operated by some liquid fuel and by atmospheric air during the time the boat is at the surface. During that time the engine not only drives the boat but it serves to load electric storage cells and for that purpose actuates an electric generator. The boat is propelled, during the time it is submerged, by an electro-motor fed by the storage battery.

It would be possible to continue the working of the combustion engine for direct propulsion while the boat is submerged if the air needed for this purpose could be stored on board. This is however a practical impossiblity because the volume and the weight of the air vessel must be unduly large even when a high pressure is resorted to. If however instead of using air, carriers of oxygen containing a larger proportion of oxygen than air and particularly such as are obtainable in the liquid state under a moderate pressure are employed, the weight and the volume of the carrier of oxygen including its containing vessel are greatly reduced for the same amount of work done as compared with the use and storage of air. It is not practicable however to use substances rich in oxygen in a combustion engine instead of air without special provisions because by reason of the lack of the nitrogen of the air, they generate too high temperatures and, more particularly in explosion engines, unduly high pressures.

The present invention consists in cooling part of the products of combustion of the engine and in adding it as a cooling diluting agent to the combustible fuel and to the carrier of oxygen either before or during the mixing of these two substances. If *e.g.* the fuel is benzol and the carrier of oxygen, dioxid of nitrogen $NO_2$, the products of combustion consist of carbonic acid, water vapor and a small amount of nitrogen. If part of these is cooled there remains a mixture of carbonic acid and nitrogen which is very well fitted as a diluting agent for the charge. This part of the products of combustion used as a diluting agent thus performs a circulating motion, as it were, and by this means the storing and the carrying on board of a diluting agent for the reduction of temperature, are obviated.

It is particularly useful, when carrying out the above described method in an engine operated on the two-stroke cycle, in which the burned gases are not expelled from the cylinder by the motion of the piston but by their own pressure to make use of the modification of the method, which consists in spraying water or some other liquid in the hot burned gases contained in the cylinder during the latter part of the expansion period or during the compression period, whereby the burned gases are cooled. The water vapor produced thereby and which mixes with the amount of the burned gases that did not leave the cylinder at the end of the expansion stroke, then forms the diluting agent together with these gases. The advantage of this modification as against performing the cooling of the burned gases outside of the engine cylinder consists in the saving of the cooling chamber and in saving the work otherwise spent in expelling the burned gases from and reintroducing them into the cylinder.

The introduction of the combustible fuel and of the carrier of oxygen into the cylinder may be carried out in various ways. Either of these components may be introduced at different moments or simultaneously either separately or mixed.

In the accompanying drawing, we have illustrated, in sectional elevation, and partly broken away, the cylinder of a combustion engine, adapted for the practice of the invention.

The mixture of fuel and oxygen-carrier, admitted respectively into the cylinder 2, through the timed valves 4, 5, is ignited when the piston is at the innermost limit of its stroke. At the end of the expansion stroke, the ports 6 are uncovered by the piston, and, in consequence, of the internal pressure, a portion of the products of combustion escapes from the cylinder. The portions of the products of combustion remaining in the cylinder and which are still very hot, are thereupon cooled by the spraying in of water, preferably at this juncture, through the valve 7, and, at the forward stroke of the piston, they are compressed. The spraying in of the water may, in some instances occur, somewhat later, i. e. immediately after the piston begins its return or compression strokes.

The shaft 8 with its timing cams or eccentrics, actuates the valve-stems at the requisite predetermined intervals, as will be well understood by those skilled in the art. The inward or return movement of the piston draws in through the port 3 a new supply of combustible and oxygen-carrier, with which the diluent commingles, and the resultant charge is ignited, as before; so that the same operation is repeated with each revolution of the cam shaft.

What we claim is:

1. The method of operating combustion engines, which consists in igniting and exploding in the working cylinder thereof, an explosive charge containing a combustible and a substance richer in oxygen than air, exhausting a portion of the resultant products of combustion, retaining and cooling the remainder of the products of combustion by spraying water into them, and admitting the next succeeding charge of combustible and oxygen-carrier into the said retained, cooled and sprayed portion of the products of combustion; substantially as described.

2. The method of operating combustion engines, which consists in igniting and exploding in the working cylinder, an explosive charge containing a combustible and a substance richer in oxygen than air, exhausting a portion of the resultant products of combustion, retaining and cooling the remainder of the products of combustion by spraying water into them, compressing said cooled portion, and drawing the next succeeding charge of combustion and oxygen-carrier into the said retained, cooled, sprayed and compressed portion; substantially as described.

In testimony whereof we have affixed our signatures, in presence of two witnesses.

PAUL WINAND.
HANS NEUMANN.

Witnesses:
BESSIE F. DUNLAP,
LOUIS VANDORN.